United States Patent
Marzolin et al.

(10) Patent No.: US 7,105,222 B2
(45) Date of Patent: Sep. 12, 2006

(54) DIFFUSING COATING

(75) Inventors: Christian Marzolin, Paris (FR); Jean-Luc Allano, Deuil la Barre (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/275,816

(22) PCT Filed: May 23, 2001

(86) PCT No.: PCT/FR01/01591

§ 371 (c)(1), (2), (4) Date: Feb. 10, 2003

(87) PCT Pub. No.: WO01/90787

PCT Pub. Date: Nov. 29, 2001

(65) Prior Publication Data

US 2003/0165675 A1  Sep. 4, 2003

(30) Foreign Application Priority Data

May 23, 2000 (FR) .................................. 00 06584

(51) Int. Cl.
*B32B 5/16* (2006.01)
*B32B 17/06* (2006.01)

(52) U.S. Cl. ...................... 428/323; 428/328; 428/329; 428/331; 428/332; 428/334; 428/336

(58) Field of Classification Search ................ 428/328, 428/334

See application file for complete search history.

(56) References Cited

U.S. PATENT DOCUMENTS

| 5,869,128 A | 2/1999 | Meulendijks et al. ......... 427/64 |
| 5,948,481 A | 9/1999 | Yan et al. ................ 427/419.3 |
| 6,034,470 A | 3/2000 | Vollkommer et al. ....... 313/485 |
| 6,302,926 B1 | 10/2001 | Anselmann et al. .......... 23/313 |
| 6,590,625 B1 * | 7/2003 | Umemoto et al. ............ 349/65 |

FOREIGN PATENT DOCUMENTS

| EP | 688818 A1 * | 12/1995 |
| JP | 02173701 | 12/1988 |
| JP | 03084848 A * | 4/1991 |
| JP | 09113707 | 10/1995 |
| JP | 11038232 | 7/1997 |
| JP | 11323196 | 5/1998 |
| JP | 11038232 A * | 2/1999 |

* cited by examiner

*Primary Examiner*—Monique R. Jackson
(74) *Attorney, Agent, or Firm*—Oblon, Spivak, McClelland, Maier & Neustadt, P.C.

(57) ABSTRACT

The invention relates the field of light boxes, and more specifically to a diffusing layer intended to be deposited on a substrate for making a light source homogeneous. The diffusing layer according to the invention consists of agglomerated semitransparent mineral particles in a mineral binder and is characterized by the particles having a mean diameter of between 0.3 and 2 microns, the binder being in a proportion of between 10 and 40% by volume, the particles forming aggregates whose size is between 0.5 and 20 microns, preferably less than 5 microns, and the layer having a contrast attenuation of greater than 40%. The invention also relates to uses for the production of flat lamps.

18 Claims, No Drawings

DIFFUSING COATING

FIELD OF THE INVENTION

The invention relates to the field of light boxes and more particularly to a diffusing layer intended to be deposited on a substrate in order to make the light source homogeneous.

BACKGROUND OF THE INVENTION

Although the invention is not limited to such applications, it will be more particularly described with reference to layers used to make the light emitted from a light box, in particular a flat lamp homogeneous. Such a flat lamp may especially be a back-light source, used especially in flat-screen computers to illuminate a liquid-crystal screen. They may also be architectural flat lamps used, for example, on ceilings, floors or walls. They may also be flat lamps for municipal applications, such as lamps for advertising panels or lamps able to constitute the shelves or backs of display cabinets.

These flat lamps may also find applications in other fields, such as, for example, the automobile industry since it is conceivable to produce motor-vehicle roofs part of which includes such a lamp, particularly to substitute for the currently known illumination of the passenger compartment of a motor vehicle. It is also possible to produce the backlighting for motor-vehicle dashboards.

Moreover, the expression "flat lamp" should be understood as corresponding to a construction made from two substrates which are initially substantially flat but which, however, may have a slight curvature for a given application.

These flat lamps, as described for example in the U.S. Pat. No. 6,034,470, therefore consist of two substantially flat substrates, such as glass sheets, on which various layers making up the lamp are deposited. For example, on the first glass sheet, which is the rear sheet of the lamp, silver electrodes coated with a dielectric are deposited on the internal face and layers of alumina and phosphor are deposited on the other face. Layers of alumina and phosphor are deposited on the internal face of the other glass sheet, the alumina layer forming reflection regions allowing the light emitted by the said lamp to be made homogeneous. Other materials, such as titanium oxide, may also serve as reflecting layers.

However, it is apparent that the light thus emitted, especially in the case of backlighting for liquid-crystal screens, is not sufficiently homogeneous and has excessively large contrasts. Solutions to improve the homogeneity of the light from these lamps have already been realized. Treatments of the front surface of the glass sheet, such as frosting by sand-blasting or hot-patterning the surface of the glass, or else an opaline coloration through the thickness of the glass, have been proposed, among other suggestions, but are not sufficient and often too expensive. A satisfactory solution from the standpoint of homogeneity consists in covering the front face of the glass sheet with a plastic such as a frosted polycarbonate or acrylic polymer. However, this solution has the drawback of requiring several layers of plastic coating which result in an overall thickness of at least 5 mm. Such a coating thickness added to the other components making up the screen results in a considerable increase in the overall thickness of the lamp. This goes counter to the current trend towards reducing the overall size of screens in terms of thickness. The increase in the thickness also causes a reduction in the luminance of the lamp. Another drawback of such a lamp is that the plastic coating does not withstand the high temperatures required for its production, especially when carrying out the steps of depositing the electrodes and of sealing the periphery of the glass sheets.

The inventors were thus tasked with finding a means resulting in homogeneity of the light emitted by a flat lamp which is at least equivalent to the abovementioned solution but does not have its drawbacks, especially in terms of overall size and loss of luminance.

SUMMARY OF THE INVENTION

This objective is achieved according to the invention by a diffusing layer consisting of agglomerated particles in a binder, the said particles having a mean diameter of between 0.3 and 2 microns, the said binder being in a proportion of between 10 and 40% by volume and the particles forming aggregates whose size is between 0.5 and 20 microns and preferably less than 5 microns, the said layer having a contrast attenuation greater than 40% and preferably greater than 50%.

DETAILED DESCRIPTION OF THE INVENTION

The contrast attenuation is determined by measuring the contrast of a test pattern; a transparent test pattern consisting of black lines 8 mm in width and spaced apart by 8 mm is placed on a light table. The upper face of the diffusing layer to be measured is placed at a distance of 3 mm from the test pattern and an image is obtained by a camera and analysed. The contrast attenuation is defined by c, such that:

$$c = 1 - (C/C_0)$$

where C is equal to the standard deviation of L over the mean of L and $C_0$ is the standard deviation of $L_0$ over the mean of $L_0$, $L_0$ being the image of the test pattern without the diffuser, wherein the image of the test pattern is converted to a signal profile which is then converted into a histogram to obtain the mean and the standard deviation of $L_0$ and L being the image of the test pattern with the diffuser present, wherein the image of the test pattern is converted to a signal profile which is then converted into a histogram to obtain the mean and the standard deviation of L.

Such a diffusing layer can be used instead of the abovementioned plastic layers, with a markedly smaller thickness for a given homogeneity of the light from a given lamp.

According to a preferred embodiment of the invention, the layer has a light transmission $T_L$ greater than 45% and preferably greater than 60%. The light transmission is measured under illuminant $D_{65}$.

According to an advantageous embodiment of the invention, the particles are semitransparent particles and preferably mineral particles such as oxide, nitride or carbide particles.

Preferably, the particles will be chosen from silicon, aluminium, zirconium, titanium and cerium oxides, or from a mixture of at least two of these oxides.

Such particles may be obtained by any means known to those skilled in the art, and especially by precipitation or by pyrogenation. According to the invention, the particles have a size distribution such that at least 50% of the particles differ by less than 50% from the mean diameter.

According to an advantageous embodiment of the invention, the binder has a temperature resistance sufficient to withstand the operating temperatures and/or the sealing temperature of the lamp if the layer is produced during assembly of the lamp and especially before the latter is sealed. In this regard, a mineral binder proves to be particularly advantageous when the diffusing layer must withstand a high temperature, greater than about 300° C.

When the layer is in the external position, the binder is also advantageously chosen so as to have an abrasion resistance sufficient to undergo, without any damage, all the handling operations carried out on the lamp, for example especially when mounting the flat screen.

Depending on the requirements, the binder chosen may be a mineral binder, for example when it is desired to obtain a layer which resists high temperatures, or an organic binder, especially to simplify the production of the said layer, crosslinking possibly being obtained simply, for example when cold. Choosing a mineral binder having a high temperature resistance will, in particular, allow large flat lamps to be produced without any risk of degradation of the layer appearing caused by, for example, fluorescent tubes which generate a considerable amount of heat. This is because, with the known solutions, thermal degradation of the plastic film occurs, which therefore makes it very difficult to produce large flat lamps.

Advantageously, the binder has a refractive index different from that of the particles and the difference between these two indices is preferably at least 0.1. The refractive index of the particles is advantageously greater than 1.7 and that of the binder is preferably less than 1.6.

According to a preferred embodiment of the invention, the binder is chosen from mineral binders, such as potassium silicates, sodium silicates, lithium silicates and aluminium phosphates, and organic binders, such as polymers of the polyvinyl alcohol, thermosetting resin and acrylic types. A mineral binder is particularly preferred.

To encourage the formation of aggregates with the desired size, the invention advantageously provides for the addition of at least one additive resulting in a random distribution of the particles in the binder. Preferably, the dispersing additive or agent is chosen from the following agents: an acid, a base, divalent ions and ionic polymers of low molecular mass, especially less than 50 000 g/mol.

It is also possible to add other agents, for example a wetting agent such as nonionic, anionic or cationic surfactants, in order to provide a layer which is homogeneous on a large scale.

It is also possible to add rheology modifiers, such as cellulose ethers.

The layer thus defined may be deposited with a thickness of between 1 and 20 microns. The methods of depositing such a layer may be all means known to those skilled in the art, such as depositing by screen printing, by coating a paint, by dip coating, by spin coating, by flow coating, by spraying, etc.

When the desired thickness of the deposited layer is greater than 2 microns, it is advantageous to use a deposition process of the screen-printing type.

When the thickness of the layer is less than 4 microns, it is preferably deposited by flow coating or by spraying.

The invention also provides for the production of a layer whose thickness varies according to the area of coverage on the surface; such an embodiment may allow intrinsic inhomogeneities in a light source to be corrected. For example, it is possible in this way to correct the variation in illumination of a fluorescent tube along its length. According to another embodiment, resulting substantially in the same effect of correcting the intrinsic inhomogeneities of a light source, the invention provides for there to be a layer whose covering density varies over the deposition surface; this may, for example, be a coating, deposited by screen printing, the density of spots of which varies from a completely covered region to a region of dispersed spots, the transition being gradual or otherwise.

According to the invention, such layers may be deposited on transparent or semitransparent substrates which, depending on the application, have a planar shape or a non-planar shape. The applications envisaged by the invention are especially flat lamps, for example those used for the illumination of liquid-crystal screens, or for architectural illumination or else for municipal illumination.

In the case of flat lamps, the layer is advantageously deposited on the glass sheet constituting the front face of the lamp.

According to a first embodiment, the layer is deposited on that face of the glass sheet which is on the inside of the lamp; according to such an embodiment, the layer must be deposited on the glass sheet during production of the lamp. According to this embodiment, the layer must have a temperature resistance sufficient to withstand the various heat treatments needed to produce such a lamp, especially for carrying out the deposition operations corresponding to the production of the electrodes and for sealing the periphery of the two glass sheets forming the structure of the flat lamp. The layer according to the invention will therefore be advantageously made with a mineral binder.

According to this first embodiment, the diffusing layer according to the invention may, according to one variant, be deposited directly on the glass or, according to a second embodiment, be deposited on the layers that have already been deposited on the glass. If spacers are necessary, especially for keeping a uniform space between the two glass sheets, the invention advantageously provides for deposition of the diffusing layer leaving free regions corresponding to the locations intended for the spacers, in such a way that the adhesion of the spacers is not disturbed by the layer according to the invention. Such free spaces may easily be obtained by choosing to deposit the layer using a screen-printing technique.

According to a second embodiment, the layer is deposited on that face of the glass sheet which is on the outside of the lamp; according to this embodiment, the diffusing layer according to the invention is advantageously chosen to have enhanced mechanical-strength properties and more particularly abrasion-resistance properties. The layer is then advantageously produced with a mineral or organic binder in an amount greater than 15% and preferably greater than 20%.

According to an alternative embodiment of the invention, relating to the use of the diffusing layer in the production of a flat lamp, the said diffusing layer is deposited on a transparent or semitransparent substrate independent of the glass sheets forming the structure of the flat lamp. Such an embodiment may consist in depositing the diffusing layer on a glass substrate held at a certain distance from the front face of the lamp; this embodiment makes it possible, according to the laws of physics, to further improve the diffusing effect of the layer. This is offset by the fact that the volume or overall size of such a construction becomes equivalent to the previously known solutions, but in this case with better performance as regards diffusion.

The invention also advantageously provides for a diffusing layer to be deposited on each side of the substrate, whether this is one of the glass sheets forming the structure of the flat lamp or an independent substrate.

The diffusing layers thus presented according to the invention therefore make it possible to produce flat lamps intended, for example, for the illumination of liquid-crystal screens. Compared with the previously known solutions, the layer according to the invention makes it possible to reduce the overall size of the said lamp for a given performance in terms of contrast attenuation.

Depending on the alternative uses of these layers, the performance in terms of contrast attenuation of the light emitted by flat lamps can be improved for an overall size of the said lamps which is equivalent to that of the prior art.

Further details and advantageous features will become apparent below from the description of the illustrative examples of the invention which follow.

EXAMPLES

The first example corresponds to a layer according to the invention intended to be deposited on the front face of a flat lamp for the illumination of a liquid-crystal screen.

The following mixture was produced:

15 g of alumina particles having a mean diameter of 1 micron were put into 65.5 g of deionized water, into which 0.4 g of 50% polyacrylic acid, as dispersion-inducing additive, and 0.3 g of a wetting agent—octylphenol ethoxylate sold by Union Carbide under the name TRITON X-100—were added.

The solution thus prepared was mixed in a turbine for two minutes.

Next, 19 g of a 20% aqueous solution of polyvinyl alcohol were added and the mixture thus formed put back through the turbine for 5 minutes.

A diffusing layer was then produced from this mixture on a glass sheet by a flow-coating technique. The mixture was deposited with an amount such that the layer once dried had a thickness of 1.5 microns.

Example 2 is a layer produced according to the invention from the mixture of Example 1 deposited on a glass sheet in order to form a dry layer having a thickness of 4 microns.

Example 3 is an layer produced according to the invention from the mixture of Example 1 deposited on a glass sheet in order to form a dry layer having a thickness of 1 micron.

Example 4 is a layer according to the invention from the following mixture.

15 g of alumina particles having a mean diameter of 1 micron were introduced into 65.5 g of deionized water, to which 0.4 g of 50% polyacrylic acid as dispersion-inducing additive and 0.3 g of a wetting agent—octylphenol ethoxylate sold by Union Carbide under the name TRITON X-100—were added.

The solution thus prepared was mixed in a turbine for two minutes.

Next, 32 g of a 20% aqueous solution of polyvinyl alcohol was added and the mixture thus formed put back through the turbine for 5 minutes.

A diffusing layer was then produced from this mixture on a glass sheet by a flow-coating technique. The mixture was deposited with an amount such that the layer once dried had a thickness of 4 microns.

Example 5 is a layer according to the invention from the following mixture.

15 g of alumina particles having a mean diameter of 1 micron were introduced into 65.5 g of deionized water, to which 0.4 g of 50% polyacrylic acid as dispersion-inducing additive and 0.3 g of a wetting agent—octylphenol ethoxylate sold by Union Carbide under the name TRITON X-100—were added.

The solution thus prepared was mixed in a turbine for two minutes.

Next, 50 g of a 20% aqueous solution of polyvinyl alcohol were added and the mixture thus formed put back through the turbine for five minutes.

A diffusing layer was then produced from this mixture on a glass sheet by a flow-coating technique. The mixture was deposited with an amount such that the layer once dried had a thickness of 4 microns.

Example 6 is a layer produced according to the invention from a mixture described below, in which a mineral binder is used.

15 g of alumina particles having a mean diameter of 1 micron were introduced into 72 g of deionized water, to which 0.4 g of 50% polyacrylic acid as dispersion-inducing additive were added. Next, sodium hydroxide was added until a pH of 10 was reached. The mixture was then homogenized in a turbine for two minutes.

Next, 12.7 g of a 25% aqueous solution of lithium silicate binder and 0.3 g of a wetting agent—octylphenol ethoxylate sold by Union Carbide under the name TRITON X-100—were added.

The solution thus prepared was again put through a turbine for 5 minutes.

A diffusing layer was then produced from this mixture on a glass sheet by a flow-coating technique. The mixture was deposited with an amount such that the layer once dried had a thickness of 2 microns.

Examples 7 and 8 are comparative examples which use a technique of the prior art mentioned above, which consists in using as diffusing element frosted plastic films which are placed in front of the front face of the flat lamp.

Example 7 corresponds to a plastic film having a thickness of 1 mm.

Example 8 corresponds to the superposition of two plastic films identical to that of Example 7 in order to obtain a total thickness of 2 mm.

Example 9 is a layer produced according to the invention from the mixture described below.

4 g of a suspension of 50% polyacrylic acid by weight in water and sodium hydroxide (NaOH) were added to 549 g of deionized water so as to obtain a pH of 9. Next, 288 g of an aqueous suspension containing 52% by weight of zirconia particles having a mean diameter of 1 micron (sold by Norton under the name SLURRY 9839) were added to the mixture. The mixture thus prepared was put through a turbine for 10 minutes. Next, 158 g of a suspension of a 20% lithium polysilicate binder by weight in water (sold by Grace under the name LUDOX) and 1 g of a wetting agent (sold by Union Carbide under the name TRITON X-100) were added.

A diffusing layer was then produced from this mixture on a glass sheet using a flow-coating technique. The mixture was deposited in an amount such that the layer once dried had a thickness of 2 microns.

Example 10 is a layer produced according to the invention from the following mixture.

4 g of a polyacrylic acid suspension containing 50% by weight in water and sodium hydroxide (NaOH) were added to 687 g of deionized water so as to obtain a pH of 9. Next, 150 g of alumina particles having a mean diameter of 1 μm were added to the mixture. The mixture thus prepared was put through a turbine for 10 minutes. Next, 158 g of a binder suspension containing 20% by weight lithium polysilicate in water (sold by Grace under the name LUDOX) and 1 g of a wetting agent (sold by Union Carbide under the name TRITON X-100) were added.

Next, a diffusing layer was produced from this mixture on a glass sheet using a flow-coating technique. The mixture was deposited in an amount such that the layer once dried had a thickness of 2.5 microns.

Example 11 is a comparative example which consists in using the following mixture in which the particles have a small size.

4 g of a suspension of 50% by weight polyacrylic acid in water and sodium hydroxide (NaOH) were added to 87 g of deionized water so as to obtain a pH of 9. Next, 750 g of a suspension of alumina particles (mean diameter 0.2 microns) containing 20% particles by weight in water were added. The mixture thus prepared was put through a turbine for 10 minutes. Next, 158 g of a suspension containing 20% lithium polysilicate in water (sold by Grace under the name LUDOX) and 1 g of a wetting agent (sold by Union Carbide under the name TRITON X-100) were added.

Next, a diffusing layer was produced from this mixture on a glass sheet using a flow-coating technique. The mixture was deposited in an amount such that the layer once dried had a thickness of 2 microns.

The various diffusing layers according to Examples 1 to 11 thus deposited on a glass sheet were then tested according to the contrast attenuation measurement method described above.

Light transmission measurements under illuminant $D_{65}$ were carried out on these various examples.

The resistance to scratching by a fingernail of the diffusing layers according to Examples 3 and 9 to 11 were also assessed visually. The resistance is termed "good" when the layer does not become detached from the glass sheet and "poor" when the layer delaminates, revealing the glass, after the surface has been scratched with a fingernail.

The temperature resistance of the diffusing layers was determined after the said layers had been subjected to 450° C. for 1 hour. Resistance denoted "−" means that the layer examined by the naked eye had at least partially degraded. Conversely, the resistance is denoted "+" when the layer retains its original appearance.

The various results obtained are given in the table below.

| Example | Contrast attenuation (%) | $T_L$ (%) | Scratch resistance | Temperature resistance |
| --- | --- | --- | --- | --- |
| 1 | 52 | 66 | n.d | − |
| 2 | 65 | 47 | n.d | − |
| 3 | 43 | 76 | poor | − |
| 4 | 54 | 64 | n.d. | − |
| 5 | 48 | 69 | n.d. | − |
| 6 | 62 | 60 | n.d. | + |
| 7 (comparative) | 43 | 72 | n.d. | − |
| 8 (comparative) | 62 | 51 | n.d. | − |
| 9 | 64 | 57 | good | + |
| 10 | 66 | 55 | good | + |
| 11 (comparative) | <20 | 78 | good | + | n.d.: not determined.

The results obtained show that the diffusing layers according to the invention result in a contrast attenuation and therefore a homogeneity of the light, for example in a flat lamp for a liquid-crystal screen, which is better than that using the already-known techniques for the same overall size and a given light transmission.

These results also show that, for the same overall size and for a given contrast attenuation, the diffusing layers according to the invention result in a better light transmission than that obtained using the prior techniques.

From these results, it is also possible to deduce that, for a given contrast attenuation and a given light transmission, the diffusing layers according to the invention make it possible to produce, for example, a flat lamp having a smaller overall size than the prior techniques.

It should be noted that the layers produced from a mineral binder have a better scratch resistance and a better temperature resistance.

What is claimed is:

1. A diffusing layer comprising, (i) semitransparent mineral particles which have a mean diameter of between 0.3 and 2 microns and (ii) a mineral binder in an amount of between 10 and 40 % by volume of said diffusing layer, wherein said semitransparent mineral particles form aggregates whose size is between 0.5 and 20 microns, and said diffusing layer has a contrast attenuation of greater than 40%.

2. The diffusing layer of claim 1, wherein the size of said aggregates is less than 5 microns.

3. The diffusing layer of claim 1, wherein said diffusing layer has a light transmission, $T_L$ of greater than 45%.

4. The diffusing layer of claim 3, wherein said light transmission, $T_L$, is greater than 60%.

5. The diffusing layer of claim 1, wherein said semitransparent mineral particles are oxide, nitride or carbide particles.

6. The diffusing layer of claim 1, wherein said semitransparent mineral particles comprise silicon oxide, aluminum oxide, zirconium oxide, titanium oxide, cerium oxide, or mixtures thereof.

7. The diffusing layer of claim 1, further comprising a dispersing additive selected from the group consisting of an acid, a base, divalent ions and ionic polymers of molecular mass less than 50,000 g/mol.

8. The diffusing layer of claim 1, wherein said diffusing layer has a thickness of between 1 and 20 microns.

9. The diffusing layer of claim 1, wherein said mineral binder is selected from the group consisting of one or more potassium silicates, one or more sodium silicates, and one or more lithium silicates.

10. A flat lamp comprising said diffusing layer of claim 1.

11. A flat lamp comprising a glass substrate coated with said diffusing layer of claim 1.

12. A method of producing a component for improving the homogeneity of light in a light box comprising:
   (i) providing a substrate; and
   (ii) depositing said diffusing layer of claim 1 on said substrate.

13. The method of claim 12, wherein said depositing is screen printing, coating with a paint, dip coating, spin coating, flow coating, or spraying.

14. The diffusing layer of claim 1, wherein the semitransparent mineral particles are zirconia particles and the binder comprises a lithium polysilicate.

15. The diffusing layer of claim 1, wherein the semitransparent mineral particles are alumina particles;
   the mineral binder comprises a lithium silicate; and
   the diffusing layer further comprises a polyacrylic acid dispersion-inducing additive.

16. The light diffusing layer of claim 1, wherein the diffusing layer consists of the semitransparent mineral particles and the mineral binder and the semitransparent mineral particles are present in an amount of from 60 to 90% by volume of the diffusing layer.

17. The diffusing layer of claim 1, having a light transmission under illuminate $D_{65}$ of from 45% to 76%.

18. The diffusing layer of claim 1, wherein the light transmission with an illuminate $D_{65}$ is from 45% to 66%.

* * * * *